(12) United States Patent
Vetter et al.

(10) Patent No.: US 6,634,299 B2
(45) Date of Patent: Oct. 21, 2003

(54) GAS GENERATOR

(75) Inventors: Johann Vetter, Waldkraiburg (DE); Ernst Enzmann, Grassau (DE)

(73) Assignee: TRW Airbag Systems GmbH & Co. KG, Aschau Inn (DE)

(*) Notice: Subject to any disclaimer, the term of this patent is extended or adjusted under 35 U.S.C. 154(b) by 0 days.

(21) Appl. No.: 09/994,107

(22) Filed: Nov. 26, 2001

(65) Prior Publication Data

US 2002/0062757 A1 May 30, 2002

(30) Foreign Application Priority Data

Nov. 27, 2000 (DE) .................... 200 20 099 U

(51) Int. Cl.7 .................... C06B 45/00; C06B 45/12; C06D 5/00; C06D 5/06
(52) U.S. Cl. .................... 102/288; 102/289; 280/741; 280/743.1
(58) Field of Search .................... 102/288, 289; 280/741, 743.1

(56) References Cited

U.S. PATENT DOCUMENTS

| | | | |
|---|---|---|---|
| 2,381,130 A | 8/1945 | Lloyd | 102/32 |
| 2,448,343 A | 8/1948 | Zandmer | 102/92.5 |
| 2,551,596 A | 5/1951 | Haglund | 175/183 |
| 2,813,719 A | 11/1957 | Hopper | 273/105.3 |
| 2,907,536 A | 10/1959 | Vonzborowski | 244/12 |
| 2,923,549 A | 2/1960 | Hopper et al. | 273/105.3 |
| 2,953,377 A | 9/1960 | Brust | 273/105.3 |
| 2,998,754 A | 9/1961 | Bialy | 89/1.7 |
| 3,002,708 A | 10/1961 | Wetzel et al. | 244/3 |
| 3,135,511 A | 6/1964 | Norman et al. | 273/105.3 |
| 3,225,655 A | 12/1965 | Inglis | 89/1.7 |
| 3,410,559 A | 11/1968 | Miller, Jr. | 273/105.3 |
| 3,505,926 A | 4/1970 | Johnson | 89/1 |
| 3,610,096 A | 10/1971 | Bauman et al. | 89/1.808 |
| 3,672,301 A | 6/1972 | Abbott | 102/39 |
| 3,720,167 A | 3/1973 | Mainhardt et al. | 102/34.4 |
| 3,808,941 A | 5/1974 | Biggs | 89/1.5 R |
| 3,871,321 A | 3/1975 | Biebel et al. | 114/221 A |
| 3,898,661 A | 8/1975 | Kelly et al. | 343/18 E |
| 3,899,975 A | 8/1975 | Lawrence | 102/63 |
| 3,932,057 A | 1/1976 | Wadensten | 415/53 T |
| 3,990,367 A | 11/1976 | Smith | 102/70 R |
| 4,061,088 A | 12/1977 | Ueda | 102/28 R |
| 4,062,112 A | 12/1977 | Lake | 30/228 |
| 4,140,433 A | 2/1979 | Eckel | 415/2 |
| 4,195,571 A | 4/1980 | Becker et al. | 102/89 CD |
| 4,205,848 A | 6/1980 | Smith et al. | 273/361 |
| 4,406,227 A | 9/1983 | Becker et al. | 102/505 |
| 4,428,583 A | 1/1984 | Feagle | 273/348.1 |
| 4,446,793 A | 5/1984 | Gibbs | 102/505 |
| 4,474,715 A | * 10/1984 | Weber et al. | 102/289 |
| 4,607,849 A | 8/1986 | Smith et al. | 273/348.1 |
| 4,621,578 A | 11/1986 | Vallieres et al. | 102/202.9 |

(List continued on next page.)

FOREIGN PATENT DOCUMENTS

| | | |
|---|---|---|
| DE | 1229397 | 11/1966 |
| DE | 40 26 655 A1 | 2/1992 |
| DE | 41 41 908 A1 | 7/1992 |
| DE | 4326515 A1 | 3/1994 |
| DE | 44 35 319 A1 | 4/1996 |
| DE | 298 05 027 U1 | 9/1998 |
| EP | 0567959 A2 | 4/1993 |
| FR | 1336769 | 7/1963 |

OTHER PUBLICATIONS

Defense Electronics; "Expendable Decoys Counter Missle with New Technology"; Oct. 1986.

*Primary Examiner*—Peter A. Nelson
(74) *Attorney, Agent, or Firm*—Tarolli, Sundheim, Covell & Tummino L.L.P.

(57) ABSTRACT

The invention relates to gas generator comprising an outer housing made of plastic, in which a pyrotechnic propellant charge and an igniter having its own igniter housing are accommodated. The igniter housing consists at least partially of plastic and is welded with the outer housing.

14 Claims, 2 Drawing Sheets

U.S. PATENT DOCUMENTS

| | | | |
|---|---|---|---|
| 4,718,320 A | 1/1988 | Brum | 89/1.11 |
| 4,770,368 A | 9/1988 | Yates et al. | 244/1 TD |
| 4,796,536 A | 1/1989 | Yu et al. | 102/505 |
| 4,852,455 A | 8/1989 | Brum | 89/1.14 |
| 4,860,657 A | 8/1989 | Steinicke et al. | 102/334 |
| 4,899,662 A | 2/1990 | Santalucia et al. | 102/505 |
| 5,074,216 A | 12/1991 | Dunne et al. | 102/334 |
| 5,131,679 A * | 7/1992 | Novak et al. | 102/530 |
| 5,179,778 A | 1/1993 | Dickson et al. | 29/876 |
| 5,249,924 A | 10/1993 | Brum | 416/48 |
| 5,445,078 A | 8/1995 | Marion | 102/505 |
| 5,454,320 A | 10/1995 | Hilden et al. | 102/202.7 |
| 5,492,364 A | 2/1996 | Anderson et al. | 280/741 |
| 5,499,582 A | 3/1996 | Schiessl et al. | 102/334 |
| 5,623,116 A * | 4/1997 | Hamilton et al. | 102/289 |
| 5,634,660 A | 6/1997 | Fink et al. | 280/741 |
| 5,763,817 A * | 6/1998 | Renfroe et al. | 102/326 |
| 5,887,893 A * | 3/1999 | Lang et al. | 102/289 |
| 5,915,694 A | 6/1999 | Brum | 273/359 |
| 6,324,987 B1 * | 12/2001 | Wier | 102/530 |

\* cited by examiner

GAS GENERATOR

TECHNICAL FIELD

The invention relates to a gas generator.

BACKGROUND OF THE INVENTION

Gas generators with an outer housing made of plastic have already been proposed and tested. In an outer housing of this type, there may be accommodated a pyrotechnic propellant charge and an igniter having its own igniter housing. It is an aim of the invention to provide a gas generator in which the sealing of the igniter in the plastic housing can be carried out in a simple manner so as to prevent the entry of moisture.

BRIEF SUMMARY OF THE INVENTION

This is achieved in a gas generator which comprises an outer housing made of plastic, in which a pyrotechnic propellant charge and an igniter having its own igniter housing are accommodated. The igniter housing consists at least partially of plastic and is welded with the outer housing. The welding on of the igniter took place hitherto always only via metallic sections thereof, but not via sections of plastic. Through the invention, it becomes possible to unify the connection of the individual parts in the production of the gas generator by the welding of plastic being provided exclusively. Thus the igniter, which is usually ordered as a separately delivered part, can be simply welded into a housing part, and the housing, in so far as it consists of several parts, is then likewise closed by welding. Through the welding of the plastic, connections can be realized which are gas-tight and are protected from the entry of moisture, without the intercalation of additional sealing elements.

According to the preferred embodiment, the welding is an ultrasonic welding, i.e. a very favorably priced method.

Furthermore, the igniter preferably has electric connecting lines which extend through at least one opening in the gas generator outer housing. The igniter housing seals the opening after welding, so that no moisture can penetrate into the interior of the gas generator and no gas can emerge via the opening on activation of the gas generator. The igniter, more precisely the section of the igniter which is made of plastic and is welded to the outer housing, therefore has a dual function, because it also serves as closure for the opening for the passage of the connecting lines. A sealing of the openings by potting, as was always proposed hitherto in the prior art, can be dispensed with.

The outer housing preferably has a cup-shaped receiving part for the propellant charge and a cover to which the igniter is welded. The receiving part and the cover are likewise welded to each other, so that the same type of connection is selected.

A radial gap between the receiving part and the cover can be provided, into which a projection of the igniter protrudes, whereby the latter is additionally secured in position. Possibly, this securing in position can absorb additional forces, so that the weld seam igniter/outer housing does not have to receive the entire mechanical stress.

A particularly simple embodiment is distinguished in that contact sleeves are embedded in the cover, the igniter being provided with contact pins that are introduced into the contact sleeves. The contact sleeves are in addition preferably connected with connecting cables on their outer ends. Thus, for example, a simple electrical contacting can be achieved in that the contact sleeves, embedded into the cover by injection-molding or potting, together with the connecting lines and the cover form a preassembled unit, into which then only the igniter has to be inserted from the inside.

DETAILED DESCRIPTION OF THE PREFERRED EMBODIMENTS

Figure 1:
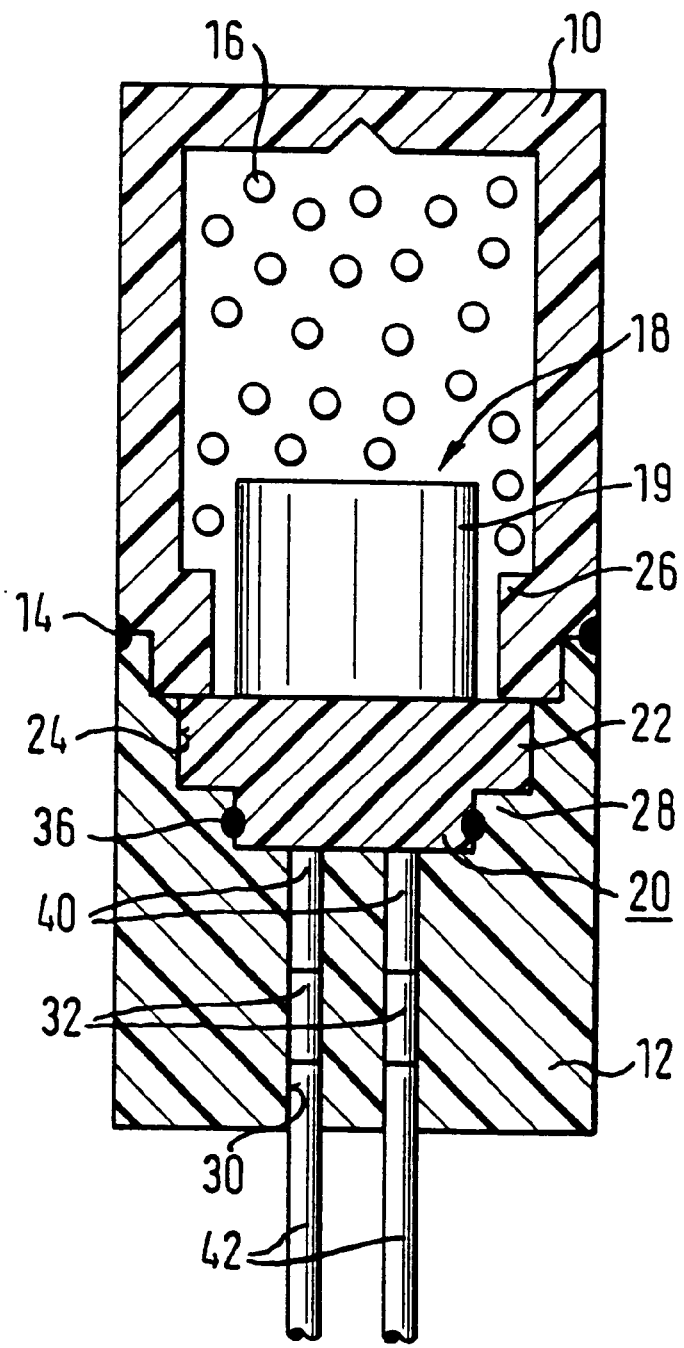
FIG. 1 shows a longitudinal section through an embodiment of the gas generator according to the invention and FIG. 2 shows a longitudinal section through a second embodiment of the gas generator according to the invention.

In FIG. 1 a gas generator is illustrated, the outer housing of which consists of two parts, namely of a cup-shaped receiving part 10 and of a cover 12 closing the receiving part 10. The receiving part 10 and the cover 12 are of the same plastic and form a gas-tight housing which is protected from the entry of moisture. Through an ultrasonic welding, which is symbolized by the weld seam 14, the receiving part 10 and the cover 12 are connected with each other. A pyrotechnic propellant charge 16 and an electric igniter 18 are housed in the receiving part 10. The igniter 18 has an outer housing of several parts which consists of an upper part 19 and a base 20 and which is preferably completely closed to the exterior, whereby the igniter forms a preassembled unit in which a further pyrotechnic propellant charge (not shown) is contained. The base 20 is of plastic, the plastic being the same plastic as that for the receiving part 10 and the cover 12.

The base 20 has a radially surrounding projection 22, which lies in a radial gap 24 between a radially inward projection 26 of the receiving part 10 and a shoulder 28 in the cover 12. The shoulder 28 is one of the surfaces which defines an opening in the cover 12, which continues outwards into two small openings 30 in which contact sleeves 32 of brass are inserted.

The projection 22 of the base 20 is gripped axially as far as possible in the radial gap 24 between the receiving part 10 and the cover 12. The actual fastening of the igniter 18 to the cover 12 takes place by a welding between the base 20 and the cover 12, which is symbolized by a surrounding, closed weld seam 36.

On the rear face of the base 20, contact pins 40 protrude from the base, which are inserted into the contact sleeves 32. The outer ends of the contact sleeves 32 receive connecting lines in the form of connecting cables 42, the outer ends of the contact sleeves 32 being pressed together in order to thereby fix the connecting cables 42.

The production of the gas generator, which is preferably an extremely small gas generator to drive a belt tensioner, takes place as follows: Firstly the contact sleeves are equipped at their outer ends with the connecting cables 42 and are pressed together. Then they are placed into a mould, in which the cover 12 is injection-molded or cast, so that the contact sleeves 32 are embedded into the cover 12. The openings 30 are thereby gastight and are sealed from the entry of moisture, without additional sealing elements being necessary.

Then the igniter 18, in relation to FIG. 1, is inserted from above into the contact sleeves 32 so that the contact pins 40 project into the associated contact sleeves 32. Now the base of the igniter 18 is ultrasonically welded to the cover 12, so that an additional sealing of the openings 30 by the base is produced, because the weld seam 36 is surrounding, gastight and is a barrier to the entry of moisture.

Parallel to this, the propellant charge 16 is filled into the receiving part 10, a space being recessed for the igniter 18 which is later projecting into the propellant charge 16.

Finally, the receiving part 10 and the cover 12 with the igniter 18 are inserted one into another and are welded ultrasonically along the weld seam 14, this weld seam 14 also being constructed so as to be closed all round and being gastight and protecting against the entry of moisture.

The electric igniter 18 can have a housing entirely of plastic or only a section of plastic, such as for example the base or, if the housing largely consists of sheet metal sections connected with each other, of a plastic ring which connects sheet metal parts with each other and seals them.

The gas generator which is shown is distinguished by small dimensions and also a simple manufacture, which can be carried out in few manufacturing steps, whilst maintaining a manufacturing process (ultrasonic welding). The propellant charge does not have a filter chamber, to save additional construction space.

In the embodiment illustrated in FIG. 1, the igniter housing is self-contained and forms a unit prefabricated separately from the outer housing.

Figure 2:
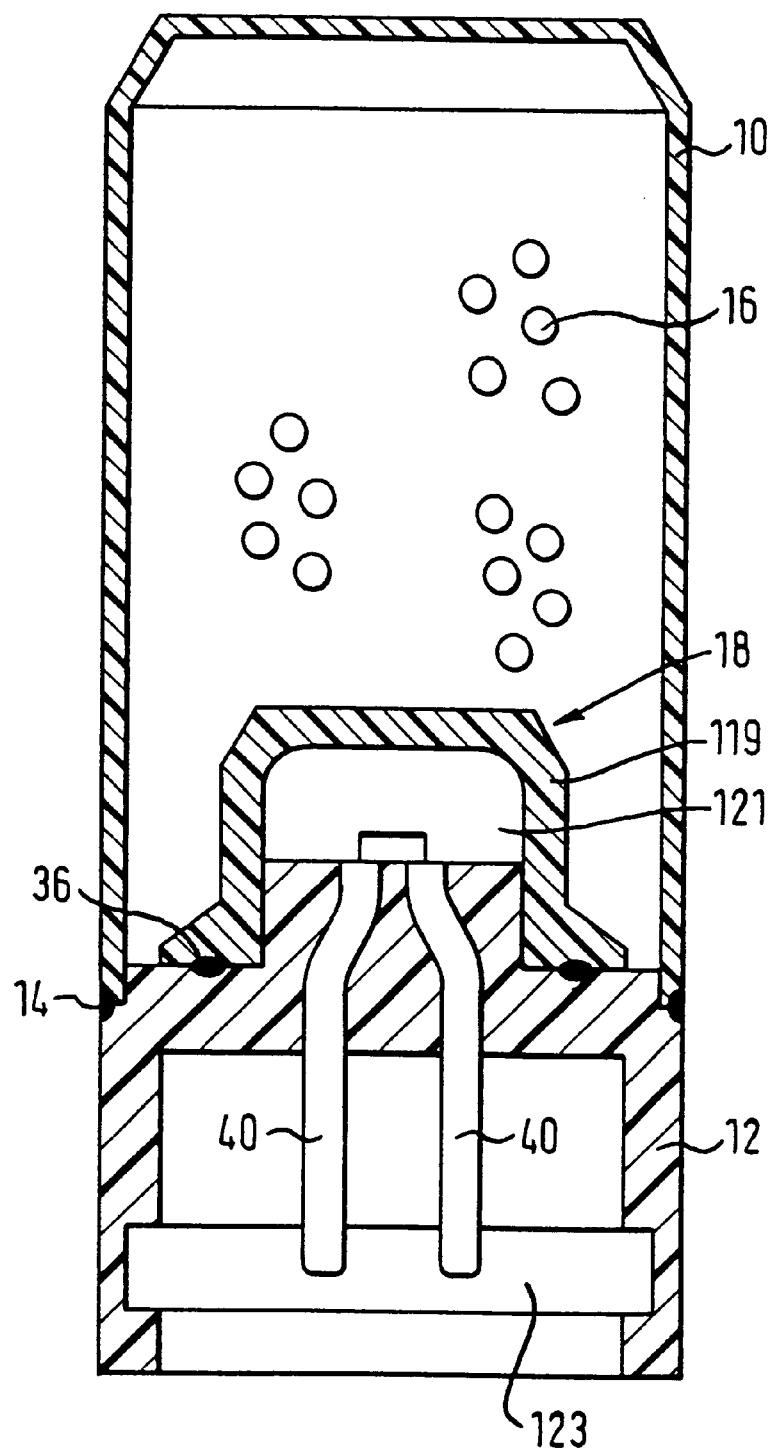

In the embodiment according to FIG. 2, the parts already mentioned in connection with FIG. 1, which have remained functionally the same, are given the reference numbers which have already been introduced.

The embodiment shown in FIG. 2 differs from this first embodiment in that before fastening to the outer housing, the igniter does not have an igniter housing which is self-contained and hence also does not form a separately prefabricated unit. Rather, the igniter housing consists of a cap 119 of plastic which is welded onto the cover 12. Reference number 36 again designates the surrounding weld seam. An igniter charge is filled into the cap 119 before placing onto the cover 12. Contact pins 40 inserted and potted in the cover 12 project into the space 121 delimited by the cap 119. On the rear face, the contact pins 40 project into an opening 123 in the cover 12, into which in addition a holding ring with short-circuiting spring (not shown) in inserted and then a plug for connection to a triggering control is introduced.

What is claimed is:

1. A gas generator comprising:

an igniter having an igniter housing, an outer housing made of plastic, in which a pyrotechnic propellant charge and said igniter housing are completely located, said igniter housing having a plastic portion, said gas generator further comprising a weld seam connecting the plastic portion of said igniter housing and said outer housing.

2. The gas generator according to claim 1, wherein said weld seam is an ultrasonic weld seam.

3. The gas generator according to claim 1, wherein said igniter housing is self-contained and is a unit separate from said outer housing.

4. The gas generator according to claim 1, wherein said igniter has electric connecting lines which extend through at least one opening in said outer housing, said opening being sealed by said igniter housing.

5. The gas generator according to claim 1, wherein said igniter housing has a base made of plastic.

6. The gas generator according to claim 1, wherein said outer housing has a cup-shaped receiving part for said propellant charge and has a cover to which said igniter is welded, said receiving part and said cover being welded with each other.

7. The gas generator according to claim 6, wherein a radial gap is provided between said receiving part and said cover, into which gap a projection of said igniter protrudes.

8. A gas generator comprising:

an outer housing made of plastic, in which a pyrotechnic propellant charge and an igniter having its own igniter housing are accommodated, said igniter housing consisting at least partially of plastic and being welded with said outer housing, wherein said outer housing has a cup-shaped receiving part for said propellant charge and has a cover to which said igniter is welded, said receiving part and said cover being welded with each other, and, wherein contact sleeves are embedded in said cover, said igniter being provided with contact pins that are introduced into said contact sleeves.

9. The gas generator according to claim 8, wherein said contact sleeves have outer ends at which they are connected with connecting cables.

10. The gas generator according to claim 8, wherein said contact sleeves together with said connecting cables are embedded in said cover by one of casting and injection-molding during the manufacture of said cover.

11. The gas generator according to claim 8, wherein said outer housing has a cover which forms a part of said igniter housing.

12. The gas generator according to claim 11, wherein said igniter housing comprises a separate, prefabricated cap which is closed by said cover.

13. The gas generator according to claim 12, wherein said cap is made of plastic.

14. The gas generator according to claim 12, wherein said cover is welded with said cap.

\* \* \* \* \*

UNITED STATES PATENT AND TRADEMARK OFFICE
CERTIFICATE OF CORRECTION

PATENT NO. : 6,634,299 B2  Page 1 of 1
DATED : October 21, 2003
INVENTOR(S) : Johann Vetter and Ernst Enzmann It is certified that error appears in the above-identified patent and that said Letters Patent is hereby corrected as shown below:

<u>Column 4,</u>
Line 34, after "claim" change "8" to -- 9 --.

Signed and Sealed this

Eighteenth Day of May, 2004

JON W. DUDAS
*Acting Director of the United States Patent and Trademark Office*